INVENTORS,
GAETANO DUCCINI.
PRIMO R. CAREDIO.
BY Chas. E. Townsend
ATTORNEY.

Patented Sept. 16, 1947

2,427,448

UNITED STATES PATENT OFFICE 2,427,448

APPARATUS FOR PRODUCING VITREOUS OR METALLIC SURFACES

Gaetano Duccini and Primo R. Caredio, San Francisco, Calif.

Application December 23, 1942, Serial No. 469,898

13 Claims. (Cl. 91—12.2)

Our invention relates to apparatus for producing vitreous or metallic surfaces on various objects and materials sought to be coated, and especially to that type of coating apparatus utilizing a so-called spray gun, whereby powdered glass or other suitable material is melted and discharged under pressure on the surface to be coated for fusion thereon.

In the art of producing vitreous surfaces on objects, such as tile and the like, it has been found that the use of glass, when heated to a molten state and discharged under pressure on to the surface of an object to be coated, produces an excellent product. However, the powdered glass is highly responsive to moisture and other foreign matter, becomes caked and an uneven feed supply results, thereby causing an imperfect melting and unsatisfactory fusion on the surface sought to be coated. The powdered glass, or other material, because of its tendency to cake, is sometimes not heated sufficiently before contacting the surface to be coated and blotches and imperfect work result.

A blow torch type of spray gun is commonly used to accomplish the two-fold purpose of heating the surface to be coated and heating the powdered material on its ejection from the nozzle of the gun. However, there is considerable waste material in this process because of lateral leakage of the powdered material from the line of the blow torch flame and the generally inefficient heating of the pulverulent.

The present invention embraces an improvement over the invention disclosed in our Letters Patent No. 2,058,218, issued October 20, 1936, particularly directed to a means of controlling, regulating and maintaining a constant flow of powdered material.

We have found that probably the greatest difficulty in producing a satisfactory product is to insure that the powdered material is thoroughly and completely melted before contacting the surface sought to be coated. Blow torch type spray guns and other devices of like character, in and of themselves, are unsatisfactory. Rather than seek to change basically the heating or fire unit per se, we have accomplished our completely successful result from a different approach; namely, by making the powdered glass and its carrying agent a self-contained combustible, hence assuring that all of the pulverulent will be completely enclosed by flame and melted by the heat developed therefrom in a truly efficient manner.

The conventional manner of carrying the pulverulent to the spray gun is to discharge air under pressure into a supply of pulverulent material and force the said pulverulent along with the air under pressure. The result is not satisfactory as the mixture is not constant as it varies with the air pressure and the pulverulent, especially if powdered glass is in an unsatisfactory melting and fusing condition.

More particularly, we have devised an apparatus calculated to place the powdered glass or other material in a state of suspension or fine dust, in warm air under pressure, and conveying the said dust-like material, in suspension, to a special mixer where it is introduced to a combustible gas and more warm air, and thence conveyed to a discharge nozzle where the gases are ignited and the pulverulent is fused. The mixture of warm air, warm pulverulent in the form of dust, and combustible gas is commingled in the mixer and in the conduit leading therefrom to the nozzle. The pulverulent fog, as glass, mixes with the combustible qualities of the gas, and when the mixture is presented to the flame in the spray gun the result is an immediate firing of the mixture producing sufficient heat to melt all of the powdered glass as it is discharged from the nozzle to the surface to be coated and thereby effect an uniform application of the fused material.

In the drawings similar characters of reference indicate corresponding parts in the several views.

Referring to the drawings:

Fig. 5 is a longitudinal sectional view of our mixer.

Figure 1:
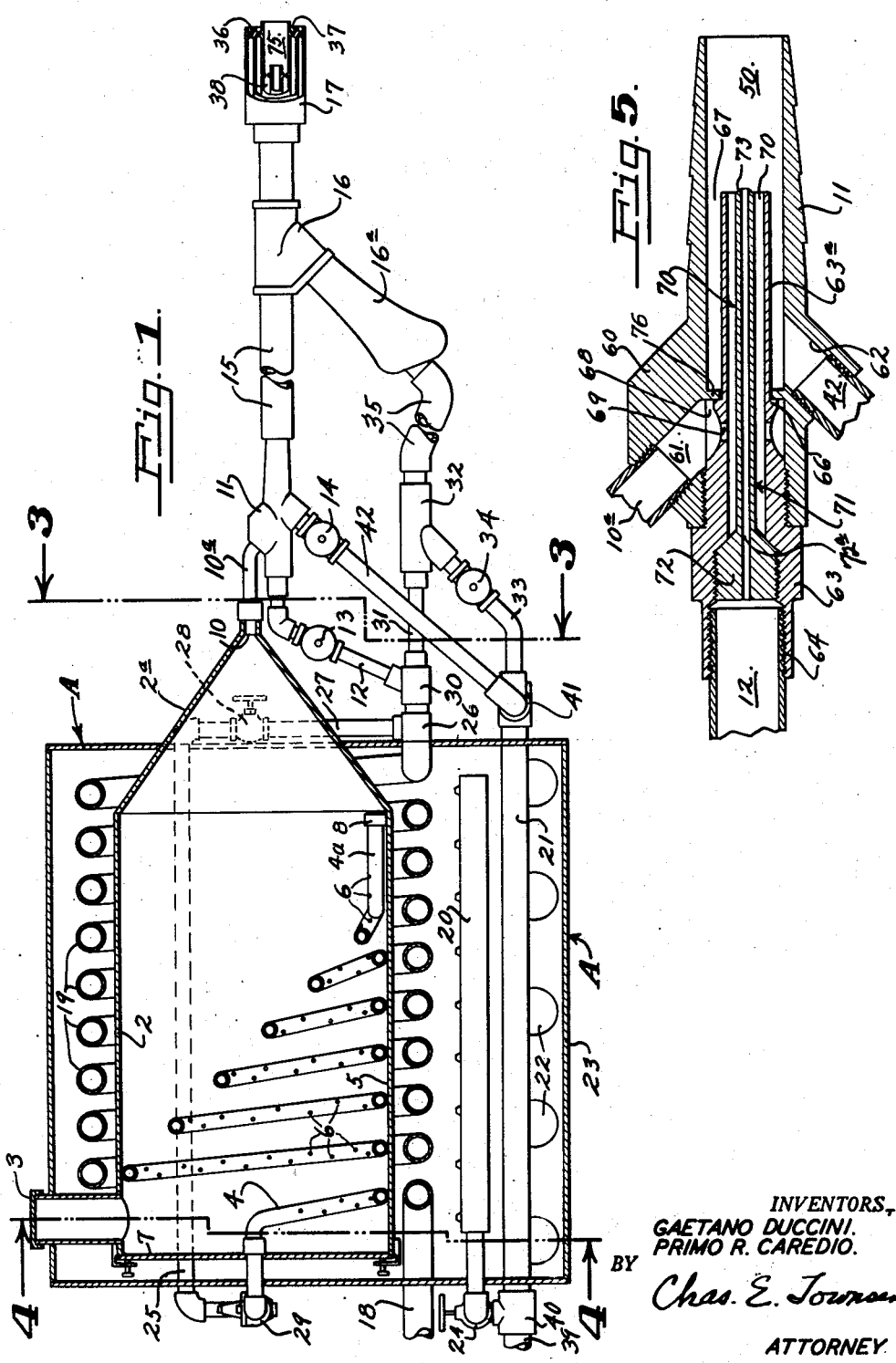
Fig. 1 is an elevation in partial section of our improved apparatus.

Referring to the drawings, Fig. 1 shows the general arrangement of our apparatus, in which a shell or casing A houses a horizontally disposed cylindrical magazine 2 adapted to hold the desired pulverulent material and in which the latter is initially treated. The pulverulent is inserted through a communicating chimney 3, adjacent to the end plate 7 of the magazine 2. Within the magazine 2 is a helically wound pipe 4 which lies adjacent to the bottom wall 5 of the magazine and is perforated, as at 6, throughout its length. The perforations 6 are preferably provided on the inside surface of the coils in order that a comparatively gentle agitation of the pulverulent material results.

The pipe 4 in side elevation resembles a stepped cone, distorted to have that side of the coils disposed adjacent to the bottom wall of the magazine and tangential thereto and parallel with the axis of the cylindrical magazine. The pipe 4 is wound in such manner as to present the helix of largest diameter nearest the end plate 7, with this first coil adjacent to the top and bottom walls of the magazine. Each turn of the pipe 4 decreases in diameter with each successive coil and terminates in a straight or horizontal section 4ª, lying adjacent to the bottom wall 5 of the magazine and capped, as at 8. Pipe 4 is preferably constructed to present a helical arrangement extending approximately one-half the length of the main body portion of the magazine 2. The terminating straight piece extends forwardly to any desired point. This magazine 2 has its forward end terminating in a cone 2ª with an axially disposed outlet 10.

Air under pressure which has been preheated, as will hereinafter be described, is introduced to the pipe 4 through the end plate 7 of the magazine 2 and is discharged through the perforations 6 and in the direction of the conical outlet 10, thereby agitating the pulverulent and causing the said pulverulent to be maintained in a state of suspension in the form of dust or a fog-like atmosphere within the said magazine. The mixture of the pulverulent dust and warm air from magazine 2 is carried by conduit 10 to mixer 11 wherein it is mixed with warm air from jet pipe 12, controlled by valve 13, and with a combustible gas, such as natural gas, introduced from pipe 42 through a flow-control valve 14.

The mixture of warm air, pulverulent and combustible gas is conveyed from the mixer 11 by means of hose 15 to a spray gun 16 having a pistol grip 16ª. The gun has a burner nozzle 17 whereby the mixture is subjected to contact with a flame as it emanates from the nozzle 17 of the spray gun, thereby causing the said mixture to ignite and to melt the pulverulent during discharge against the surface to be coated for fusion thereon.

One of the main features of this invention lies in the arrangement above described of the distorted and perforated coil 4 and the horizontally disposed magazine 2, whereby on the application of a suitable air pressure, usually around one hundred pounds, the pulverulent material is acted upon to cause it to be blown into a fine dust or fog suspended above the body of any pulverulent material lying in the bottom of the magazine. The conical end of the horizontally disposed magazine, with its outlet 10, assures a body of dust to be blown out of the exit 10 in contrast to the effect that would be produced if a stream of solids was being blown out. The density of the dust can be regulated by the amount of pressure of the air with respect to the gases to be encountered in the mixer 11.

Figure 2:
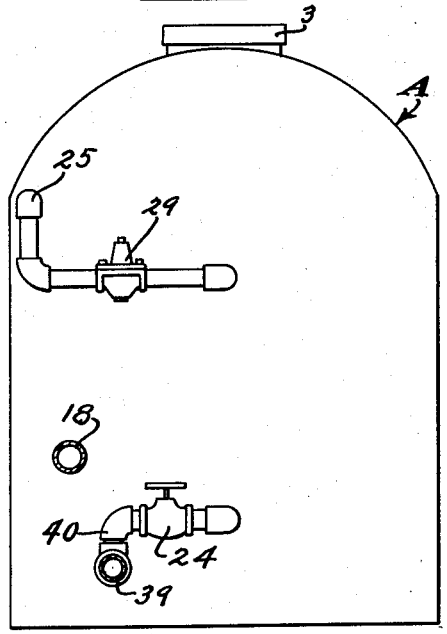
Fig. 2 is an end elevation of the back of the apparatus shown in Fig. 1.
Figure 3:
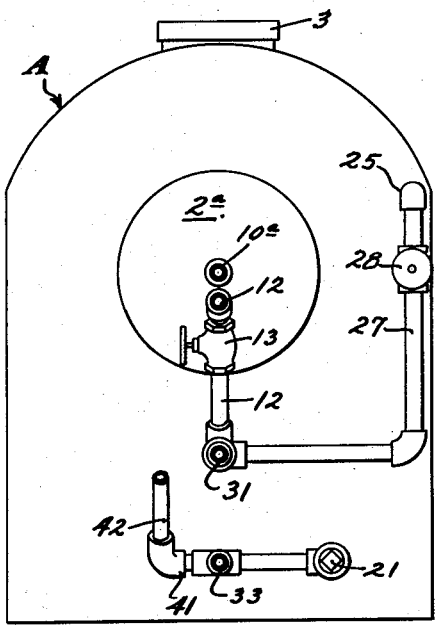
Fig. 3 is an end elevation of the front of the apparatus, taken on line 3—3 of Fig. 1.
Figure 4:
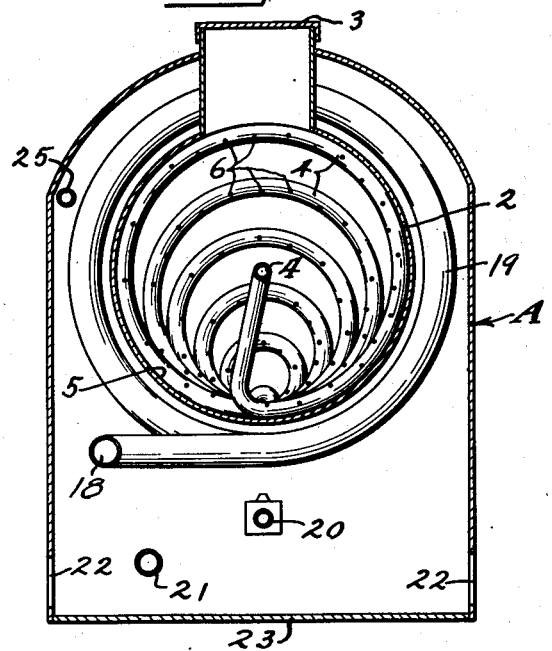
Fig. 4 is an elevation of the agitating coil, taken on line 4—4 of Fig. 1.

Referring to the circulatory system of the air, which acts as the conveying agent for the pulverulent, it has been found that air in its natural state contains a great many impurities, such as dusts, oils, moisture, etc. We have further found that these foreign substances react unfavorably with the pulverulent, particularly in the case of powdered glass. Therefore, we preferably filter the air by any suitable means before introducing it to the apparatus through inlet pipe 18, shown in Figs. 1 and 2.

The air introduced from pipe 18 is carried by a coil 19 surrounding the outside surface of the magazine 2 and lying adjacent to the circumferential walls of said magazine. The air passing through pipe 19 is warmed by a suitable heating unit 20, which is illustrated in Fig. 1 as a gas operated unit positioned above gas pipe 21 and adjacent to air ducts 22, which are provided in the outer jacket 23 of chamber A. The gas flow into burner 20 is controlled by valve 24. The heating unit not only warms the air passing through pipe 19, but also air returning through pipe 25, and, by conduction, the pulverulent within magazine 2.

The air, having passed through coil 19 and having been heated during such passage, is conveyed to a suitable fitting 26, which communicates with pipe 27 and valve 28, and thence returned through the casing A by pipe 25 (as shown in dotted lines in Fig. 1) to an automatic pressure regulator of suitable construction, adapted to withstand the heat caused by the flow of hot air therethrough, shown at 29, whereby the air pressure is regulated to a constant predetermined pressure of approximately one hundred pounds per square inch before admission to pipe 4 and therefrom discharged through the perforations 6.

The purpose of a uniform and constant pressure of air is in order to agitate the pulverulent material gently rather than to introduce relatively irregular and violent blasts of swirling currents of air and thereby keeping the pulverulent in a continual state of unpredictable turbulence. We have found that air injected into the pulverulent material in a less violent and better planned manner than has heretofore been practiced has enabled us to keep the pulverulent in a virtual state of suspension as dust, thereby making it possible to control accurately the relative proportions of air, pulverulent, and gas necessary to produce the best work.

The air after passing fitting 26 is conveyed to a Y-fitting 30, communicating with feed lines 12 and 31. Pipe 12 is provided with a valve 13 for regulation of the air supply to the mixer. Pipe 31 leads to a Y-fitting 32, with which a pipe 33 also connects. Pipe 33 conveys a combustible gas controlled by a regulating valve 34. The gas from pipe 33 and the air from pipe 31 are mixed to form the combustible mixture which is delivered by the lead hose 35 to the gun 16 and thence to the burner nozzle 17, where it meets the mixture of air, pulverulent and gas delivered through hose 15 to be discharged through tubular passages 36, 37 and 38. The gas and air discharged from annular passage 38 mix with, and are added to, the gas, air and pulverulent discharging from pipe 75 in nozzle 17. The structure of a nozzle which we have found particularly efficient is described in our application for United States Letters Patent Serial No. 565,077 for "Spray gun."

In actual practice the mixture of air and gas, discharging from passages 36, 37 and 38 is ignited and the flame suitably regulated before the gas, air and pulverulent are admitted to the spray gun. The initial flame thus created at nozzle 17 is used to pre-heat the surface to be coated, in order to drive off moisture thereon, prior to the commencement of the spraying operation. The flexible connections 15 and 35 are of sufficient length to permit a ready handling of the gun and its movements to be directed when the latter is grasped by the grip 16ª.

In the combustible gas circuit, supply pipe 39 is provided with a fitting 40, mounting a valve 24 controlling the supply of gas desired to operate suitably heating unit 20. Gas supply pipe 39 connects with pipe 21 and is provided with a suitable fitting 41, communicating with pipe 42 and its regulator valve 14 leading to the mixer 11. The fitting 41 also communicates with pipe 33 and its regulating valve 34 which controls the flow of gas to the mixer fitting 32.

The mixer 11, as shown in detail in Fig. 5, comprises a plurality of intersecting and cooperating members forming passages adapted to convey the pulverulent in suspension, the combustible gas, and the air under pressure to a mixing space 50 for mixture therein.

Referring to Fig. 5, it is seen that mixer 11 is constructed with an outer tubular casing member 60, provided with suitable connections 61 and 62; each adapted to receive, respectively, the pulverulent in suspension from exit 10 of the container and combustible gas through regulator valve 14. The tubular casing 60 forms a mixing chamber 50, wherein the component parts of the mixture commingle. Tubular insert 63, provided with a suitable connection 64 for reception of air under pressure through regulator valve 13, is concentrically disposed within tubular casing 60. Rim shoulders 66 abut against suitably disposed rim shoulder seats 76 on tubular casing 60. The latter has an extension 63a concentrically spaced from tubular casing 60 to form an annular passage 67. Intermediate of the length of the member 63 is a circumferential groove 68, provided with a plurality of ports 69 communicating with annular passage 70 formed between extension 63a and the tubular extension 71 of the perforated plug 72 which screws into insert 63. The passage 72a in plug 72 has a restricted jet orifice 73.

In the operation of the mixer, the warm air, under constant pressure, is admitted from pipe 12 and regulator valve 13 and to the central passage in plug 72 and into the mixing chamber 50. The suction caused by this stream of ejector air, acting in conjunction with the pressure which is built up within container 2, draws the warmed pulverulent dust from the container 2, through the exit 10 and pipe 10a, into channel 68, through ports 69, and out of annular passage 70. In the meantime combustible gas entering connection 62, from pipe 42 through regulator valve 14, is discharged into, and from, annular passage 67 into the said mixing chamber 50. From there the mixture is conveyed, by means of conduit hose 15, to the spray gun for ignition and discharge therefrom.

By means of our circuit of gas, air and pulverulent we may regulate each material independently of the other and thereby accurately fix our relative proportions in order to produce the best quality of work.

In practice, valve 24 is opened to allow a desired amount of gas into heating unit 20, in order to heat the helically arranged pipe 19, and by conduction the pulverulent is heated within container 2, hence driving off any moisture contained therein.

It is desirable to adjust the flame emanating from spray gun 16 prior to introduction of pulverulent thereto, so valve 28 is closed to shut off air circulation through container 2. A valve (not shown) controlling the source of air from pipe 18, and valve 13 regulate the volume of air which is conducted to spray gun 16. Valves 14 and 34 control the flow of gas.

After the flame has been properly adjusted, valve 28 is opened and the flow of air into the pulverulent is commenced and there is resultant conveyance of the suspended pulverulent into the mixer 11. At this point it is necessary to regulate the flow of air and gas into the mixer in order to insure the maximum efficiency of combustion. Hence valves 13 and 14 can be regulated independently in order to supply this need. Of course valves 28 and 29 can be adjusted to control the volume and pressure of air conjected into container 2 which directly affects the nature and quantity of pulverulent in suspension.

By the use of this invention above described, we are able to produce a vitreous or metallic coating superior to what has heretofore been possible. It enables the applicator to accomplish a surface-coating far faster than has heretofore been known and with resultant savings in labor costs and wasted materials. It provides a method of applying a vitreous or metallic coating which insures the melting and resultant fusion of all the pulverulent material without wastage. It assures an even and constant flow of pulverulent material from source to discharge, and provides means for readily and separately regulating and maintaining the flow of the pulverulent, gas, and air, both as to pressure and volume. It provides for introducing a combustible gas into the flow of warm pulverulent material and warm air, thereby making the pulverulent and its carrying agents, the air and gas, a self-contained, combustible mixture.

We attribute the foregoing advantages, largely if not mainly, to the provision of means whereby a pulverulent material is initially placed in a state of agitation and suspension to produce a fog-like dust or atmosphere, later to be mixed with a combustible gas to be delivered to the point of ignition.

Various changes in the container and circuit system may be made without departing from the spirit and scope of our invention. We do not restrict ourselves to the specific form shown in the drawings, but wish to avail ourselves of all such departures which fall within the scope of the appended claims.

What we claim is:

1. An apparatus of the character described, comprising, in combination, a horizontally disposed magazine having a conical discharge at one end and a helically wound pipe within the magazine in the form of a stepped cone distorted so that the sides of the coil disposed at the bottom walls of the magazine are substantially tangential thereto, said coil having perforations adapted to discharge compressed air from the pipe into a body of pulverulent material within the magazine in the direction of the conical outlet to create a fog-like atmosphere, means exteriorly of the magazine picking up the emitted fog-like material by a jet of air and mixing it with a combustible gas, and a burner nozzle in which the total mixture is ignited.

2. An apparatus of the character described, comprising, in combination, a horizontally disposed magazine having a conical discharge at one end and a helically wound pipe within the magazine in the form of a stepped cone, said coil having perforations adapted to discharge compressed air from the pipe into a body of pulverulent material within the magazine in the direction of the conical outlet to create a fog-like atmosphere within the magazine, a mixer having connection with the outlet of the magazine and also having an inlet for compressed air and other inlets for inflammable gas, said mixer having a mixing chamber, wherein the pulverulent discharge from the magazine and the air entering said air inlet and the inflammable gas are commingled prior to discharge from the mixing chamber, with the pulverulent material surrounded by said gases entering said last mentioned inlet, and a burner nozzle connected to said mixing chamber.

3. An apparatus of the character described, comprising the combination with a magazine for the pulverulent material, and means for agitating the pulverulent and for discharging the latter in the form of a dust, of a mixer connected with said discharge, said mixer comprising an outer tubular casing, a tubular insert entering one end of said casing and having a tubular extension forming with the inner wall of the casing an annular passageway, a hollow plug screwing into the end of the tubular insert and having a tubular extension cencentric with, and spaced from, the tubular extension of said insert, said casing and said two tubular extensions constituting three concentric passages terminating short of the length of the casing and opening into a mixing chamber in the casing, said casing having a port communicating with another port in said insert to provide fluid access into the annular passageway between the said two tubular extensions, and said casing having another port entering the annular passageway between the casing and the tubular extension of said insert, the first of said ports being connected with the magazine discharge, the latter of said ports connected with a source of inflammable gas, a source of compressed air supply connected with the passageway in the said hollow plug and a burner connected with the discharge outlet of said outer tubular casing, said burner being a different element.

4. An apparatus of the character described, comprising the combination with a magazine for the pulverulent material, and means for agitating the pulverulent and for discharging the latter in the form of a dust, of a mixer connected with said discharge, said mixer comprising an outer tubular casing, a tubular insert entering one end of said casing and having a tubular extension forming with the inner wall of the casing an annular passageway, a hollow plug screwing into the end of the tubular insert and having a tubular extension concentric with, and spaced from, the tubular extension of said insert, said casing and said two tubular extensions constituting three concentric passages terminating short of the length of the casing and opening into a mixing chamber in the casing, said casing having a port communicating with another port in said insert to provide fluid access into the annular passageway between the said two tubular extensions, and said casing having another port entering the annular passageway between the casing and the tubular extension of said insert, the first of said ports being connected with the magazine discharge, the latter of said ports connected with a source of inflammable gas, a source of compressed air supply connected with the passageway in the said hollow plug, a burner nozzle with a gaseous fluid connection with said mixing chamber, said burner nozzle being a different element than said mixer, and means intermediate the mixing chamber and burner for admitting to said connection an added mixture of air and an inflammable gas.

5. In an apparatus for coating surfaces with a vitreous or metallic substance, the combination of a source of supply for the metallic substance in the form of a pulverulent material suspended in a gaseous body, of a mixer to which said suspended pulverulent material is delivered and mixed with an inflammable gas, a burner nozzle connected with the mixer, said burner nozzle being a different element than said mixer, an additional source of combustible gas with connections by which to deliver gas to the body of suspended pulverulent material between the mixer and nozzle, and valves in said several connections so that the flow through said various fluid connections may be independently controlled.

6. In apparatus of the character described, the combination comprising a magazine including a body of pulverulent material disposed within said magazine, a discharge conduit leading from said magazine, means for discharging compressed air into said body of pulverulent material within said magazine in the direction of said discharge outlet to create a fog-like atmosphere, mixing means in flow communication with said discharge outlet and disposed exteriorly of said magazine for picking up the emitted fog-like material by a jet of air and mixing the same with a combustible gas, and a burner nozzle in flow communication with said mixing means in which the total mixture is ignited, said burner nozzle being a different element than said mixing means.

7. In apparatus for applying a vitreous or metallic surface to an object, the combination of means to create a fog-like atmosphere composed of a mixture of agitated pulverulent material and air under pressure, mixing means in flow communication with said first named means, a pipe in flow communication with said mixing means to supply a combustible gas thereto for mixture with said fog-like atmosphere, and a burner nozzle in flow communication with said mixing means, said nozzle being a different element than said mixing means.

8. In apparatus for applying a vitreous or metallic surface to an object, the combination of a magazine to contain pulverulent material, means to discharge fluid under pressure into said magazine to agitate said pulverulent material and create a fog-like atmosphere, a discharge conduit leading from said magazine, a burner nozzle in flow communication with said discharge conduit, and means to supply a combustible gas to said fog-like atmosphere for mixture therewith after said fog-like atmosphere is discharged from said magazine and prior to admission thereof to said burner nozzle.

9. In apparatus for applying a vitreous or metallic surface to an object, the combination of a means to create a fog-like atmosphere composed of a mixture of agitated pulverulent material and air under pressure, mixing means to mix said fog-like atmosphere with a combustible gas, fluid conduit means to connect said first named means and said mixing means, and a burner nozzle in flow communication with said mixing means, said burner nozzle being a different element than said mixing means.

10. In a mixing apparatus, a magazine having a discharge at one end, a helically wound, perforated pipe within the magazine, said pipe resembling a stepped cone and disposed to present the helix of the largest diameter nearest to the end of the magazine opposite the discharge, a fluid conduit wound around the outside of said magazine and in fluid communication with the largest helix of said perforated pipe, a source of air under pressure connected to said fluid conduit, a fluid mixer in fluid communication with said discharge of said magazine and said fluid conduit, a source of combustible gas connected to said mixer, and a burner nozzle in fluid communication with said mixer, said nozzle being a different element than said mixer.

11. In a mixing apparatus, a magazine having a discharge at one end, a helically wound, perforated pipe within the magazine, said pipe resembling a stepped cone and disposed to present the helix of the largest diameter nearest to the end of the magazine opposite the discharge, a fluid conduit wound around the outside of said magazine and in fluid communication with the largest helix of said perforated pipe, a source of air under pressure connected to said fluid conduit, a heating element disposed adjacent to said fluid conduit to heat air therein and the interior of said magazine, a fluid mixer in fluid communication with said discharge of said magazine and said fluid conduit, a source of combustible gas connected to said mixer, and a burner nozzle in fluid communication with said mixer, said nozzle being a different element than said mixer.

12. In a mixing apparatus, a magazine, a discharge at one end of said magazine, a perforated, helically wound pipe in said magazine, said pipe resembling a distorted stepped cone, the helix of largest diameter being adjacent to the end of the magazine opposite the discharge, said pipe terminating in straight section adjacent to the discharge, the helically wound portion of said pipe extending approximately one-half the length of said magazine, a fluid conduit wound around the outside of said magazine and in flow communication with said perforated pipe, a heating element positioned adjacent to said fluid conduit, a source of air under pressure connected to said fluid conduit, a mixer in flow communication with said fluid conduit, a source of combustible gas connected to said mixer, a burner nozzle in flow communication with said nozzle, said nozzle being a different element than said mixer, and valves to control flow of said air under pressure to said fluid conduit and to control flow of combustible gas to said mixer whereby said flow of said air and said gas may be independently controlled.

13. In apparatus for applying vitreous or metallic surfaces to an object, the combination of a container for a pulverulent material suspended in a gaseous body, of a mixer to which said suspended pulverulent material is delivered, a source of combustible gas in flow communication with said mixer, a burner nozzle in flow communication with said mixer, said nozzle being a different element than said mixer, and valves to control flow of combustible gas to said mixer and to control flow of suspended pulverulent material to said mixer.

PRIMO R. CAREDIO.
GAETANO DUCCINI.

REFERENCES CITED

The following references are of record in the file of this patent:

UNITED STATES PATENTS

| Number | Name | Date |
| --- | --- | --- |
| 2,058,218 | Duccini | Oct. 20, 1936 |
| 408,556 | Wassmund | Aug. 6, 1889 |
| 1,669,084 | Grindle | May 8, 1928 |
| 1,029,273 | Butler | June 11, 1912 |
| 2,303,458 | Hermann et al. | Dec. 1, 1942 |
| 2,072,845 | Benoit | Mar. 9, 1937 |
| 2,317,173 | Bleakley | Apr. 20, 1943 |
| 2,137,442 | Callan | Nov. 22, 1938 |
| 2,108,998 | Schori | Feb. 22, 1938 |

FOREIGN PATENTS

| Number | Country | Date |
| --- | --- | --- |
| 193,064 | Swiss | Feb. 16, 1938 |